United States Patent
Eguchi et al.

[11] Patent Number: 5,850,412
[45] Date of Patent: Dec. 15, 1998

[54] LASER GENERATOR

[75] Inventors: Satoshi Eguchi, Takarazuka; Takayuki Yamashita, Toyonaka; Hiroyuki Hayashikawa, Osaka, all of Japan

[73] Assignee: Matsushita Electric Industrial Co., Ltd., Osaka, Japan

[21] Appl. No.: 765,270

[22] PCT Filed: Apr. 25, 1996

[86] PCT No.: PCT/JP96/01125

§ 371 Date: Dec. 20, 1996

§ 102(e) Date: Dec. 20, 1996

[87] PCT Pub. No.: WO96/34438

PCT Pub. Date: Oct. 31, 1996

[30] Foreign Application Priority Data

Apr. 28, 1995 [JP] Japan ................................. 7-105500

[51] Int. Cl.⁶ ....................................................... H01S 3/00
[52] U.S. Cl. ............................................. 372/109; 359/614
[58] Field of Search ............................. 359/614; 372/109, 372/703

[56] References Cited

U.S. PATENT DOCUMENTS 5,225,933  7/1993  Myers et al. ............................. 359/614

FOREIGN PATENT DOCUMENTS

| | | |
|---|---|---|
| 58-79787 | 5/1983 | Japan . |
| 62-104183 | 5/1987 | Japan . |
| 62-183814 | 11/1987 | Japan . |
| 2194677 | 8/1990 | Japan . |
| 2137059 | 11/1990 | Japan . |
| 4130684 | 5/1992 | Japan . |
| 526771 | 2/1993 | Japan . |
| 6164030 | 6/1994 | Japan . |
| 6184786 | 7/1994 | Japan . |
| 7128611 | 5/1995 | Japan . |

Primary Examiner—Rodney B. Bovernick
Assistant Examiner—Robert E. Wise
Attorney, Agent, or Firm—Stevens, Davis, Miller & Mosher, L.L.P.

[57] ABSTRACT

The present invention relates to a laser generator in which a laser beam is generated by energizing a laser medium and is amplified optically with optically amplifying mirrors, and the laser beam is received by a absorber, wherein a spacer 9 having a through hole 9a for passing therethrough the laser beam and at least one small second through hole 9b is arranged at a circumference of an absorber 7, and a cooling medium 12 circulates in the small second through hole 9b of the spacer 9. In this structure, if a scattering laser beam is generated at the circumference of the laser beam absorber, a parallelism of the optical amplifying mirrors is maintained so that the laser generator can generate the stable laser beam.

20 Claims, 3 Drawing Sheets

(a)

(b)

LASER GENERATOR

TECHNICAL FIELD

The present invention relates to a laser generator in which a laser medium is energized, an optical amplifying mirror generates an optically amplified laser beam, and an absorber receives the laser beam.

BACKGROUND ART

In a conventional laser generator, as shown in FIG. 5(A), a laser medium 1 is energized by a laser medium energizing electric power source 2, and an optical amplifying mirrors 3a and 3b performs laser oscillation to generate a laser beam 4. A mirror holder 5 maintains the optical amplifying mirrors 3a and 3b at a parallelism necessary for the optical amplifying, and the laser beam 4 can be taken out of the optical amplifying mirror 3a and 3b if the optical amplifying mirror 3a is a partially transparent type mirror. The laser beam 4 from the optical amplifying mirrors 3a and 3b is received by an absorber 7 after passing an inside of an introduction tube 6 for protecting the laser beam. When the laser beam is taken out of the laser generator to treat a sheet metal or the like, the absorber 7 is moved, e.g., in a direction indicated by arrow A, to prevent the laser beam 4 from being interrupted, so that the laser beam 4 can be taken out of the laser generator. When the laser beam 4 is not taken out of the laser generator, the absorber 7 receives the laser beam 4 to prevent the laser beam 4 from being output from the laser generator.

In this conventional laser generator, as shown in FIG. 5(B), a scattering laser beam 8 which is not absorbed by the absorber 7 and is reflected thereby exists at a circumference of the absorber 7. A temperature of the introduction tube 6 is increased by an irradiation of the scattering laser beam 8 onto an inner surface of the introduction tube 6. The temperature thereof is conducted to the mirror holder 5 so that the mirror holder 5 is deformed by thermal expansion. The mirror holder 5 is directly irradiated by a part of the scattering laser beam 8 so that the mirror holder 5 is further deformed thermally.

As described, there is a problem that the mirror holder 5 is deformed thermally by the scattering laser beam 8 at the circumference of the absorber 7, the parallelism of the optical amplifying mirrors 3a and 3b necessary for the optical amplifying cannot be kept, and a stability of the laser beam 4 cannot be obtained.

DISCLOSURE OF THE INVENTION

An object of the present is to provide a laser generator in which the above described problem is solved, and the thermal deformation of the mirror holder is prevented.

In order to achieve this object, a laser generator of the present invention comprises a laser generating device generating a laser beam by energizing a laser medium and amplifying optically it with optically amplifying mirrors, an absorber receiving the laser beam, and a spacer which is arranged at a circumference of the absorber and has a through hole for passing the laser beam therethrough.

More in detail, the laser generator of the present invention comprises the laser generating device which has optical amplifying mirrors at respective ends thereof and interior of which is filled with the laser medium, a mirror holder holding the optical amplifying mirrors, the absorber arranged on a proceeding course of the laser beam generated by the laser generating device, and the spacer arranged between the laser generating device and the absorber and having the through hole on the proceeding course of the laser beam.

Further, the laser generator may include an introduction tube between the spacer and the mirror holder to pass the laser beam therethrough.

And, the spacer may be cooled by a cooling medium, the through hole may have a notched shape, such as a semicircle, a surface of the spacer may be coated with a material for absorbing a scattering laser beam, and the surface of the spacer may have irregularities.

By using these structures, since the spacer acts as a barrier, a great part of the scattering laser beam around the absorber is received, absorbed and reflected repeatedly by the spacer and the absorber before reaching the introduction tube or the mirror holder, so that an energy of the scattering laser beam is attenuated significantly thereby and a deformation of the mirror holder by the thermal energy is prevented.

BEST MODES FOR PERFORMING THE INVENTION

First Embodiment

Figure 1:
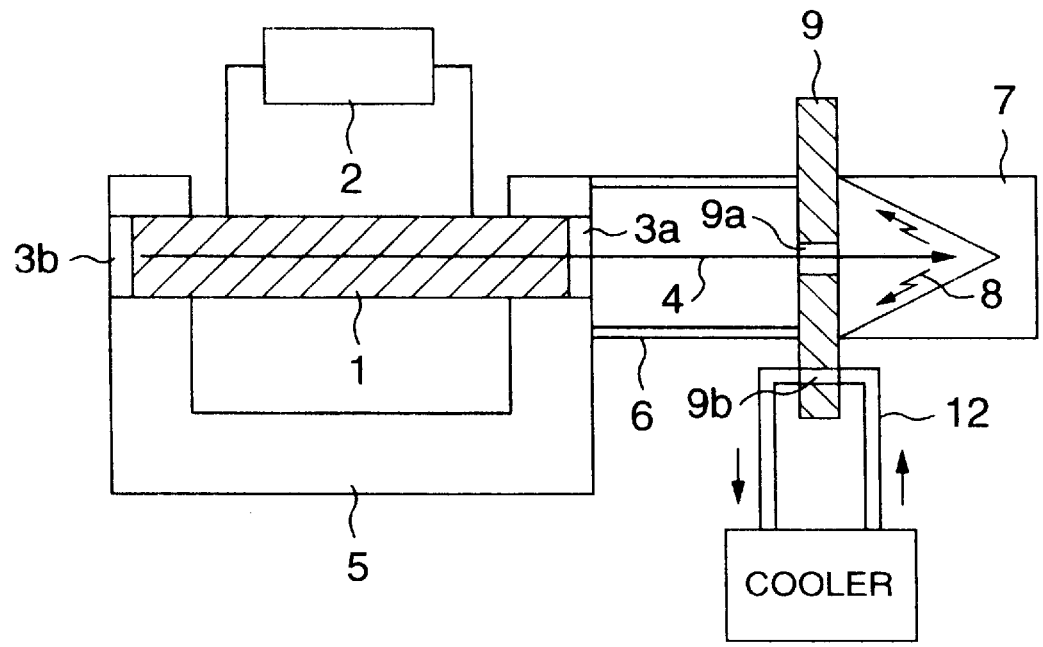
FIG. 1 is an exterior view showing a first embodiment of a laser generator according to the present invention.
Figure 5:
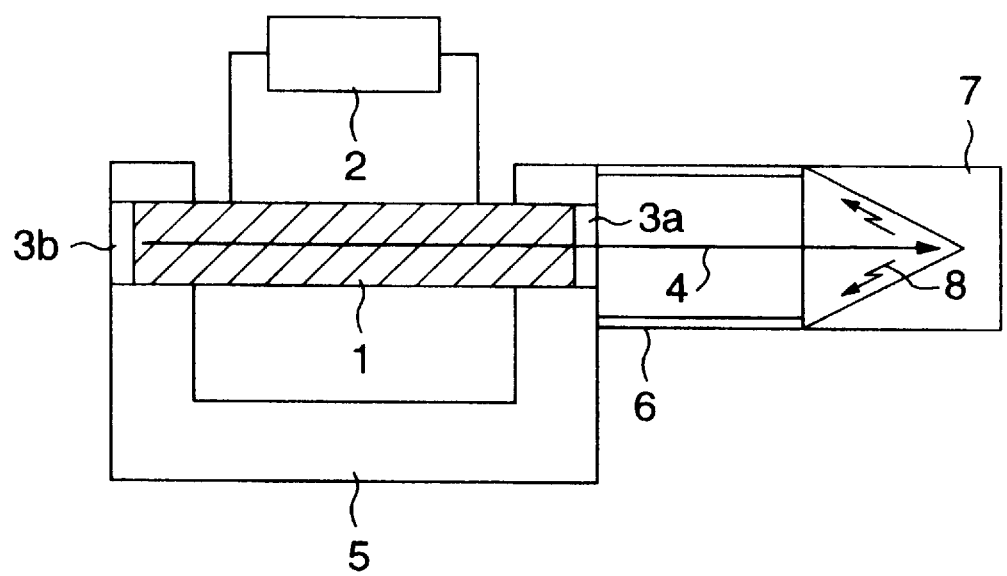
FIG. 5(A) is an exterior view showing a prior art laser generator.
FIG. 5(B) is an exterior view showing a spacer in the prior art laser generator.
Figure 5:
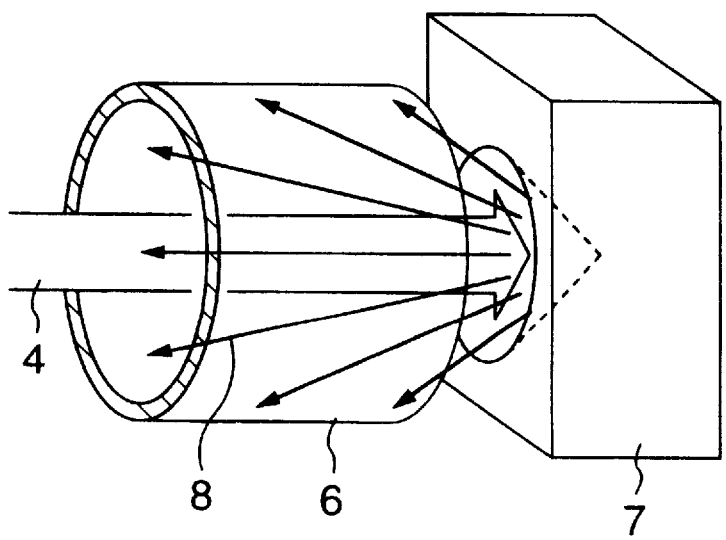

A first embodiment of the present invention is described below with referring to the drawings. FIG. 1 shows a laser generator with a spacer of the present invention. Incidentally, the same elements as the prior art elements shown in FIGS. 5A and 5B have respective same denoting numerals, so detailed descriptions thereon are omitted.

For solving the above described problems, in a laser generator, a laser beam 4 is generated by energizing a laser medium and is optically amplified by optical amplifying mirrors 3a and 3b, an absorber 7 receives the laser beam 4, a spacer 9 with a through hole 9a for passing the laser beam 4 and at least one small through hole 9b is arranged at a circumference of the absorber 7, and a cooling medium 12 circulates in the small through hole 9b of the spacer 9. The through hole 9a is a round shape with a sufficient size for passing the laser beam therethrough as shown in FIG. 1.

Since a laser beam absorbing efficient of the absorber 7 is about 90%, a great part of the laser beam 4 is received and absorbed by the absorber 7, but a remaining 10% of the laser beam 4 is not absorbed but is reflected thereby as a scattering laser beam 8. In this way, the scattering laser beam 8 is generated in the neighborhood of the absorber 7.

The laser generator of the present invention is designed by taking a shape of beam receiving portion of the absorber 7, a beam diameter of the laser beam 4, a beam strength, a thickness of the spacer 9, a diameter of the through hole 9a and so forth into consideration. Since the spacer 9 acts as the barrier, a great part of the scattering laser beam 8 around the absorber 7 is repeatedly received, absorbed and reflected by the spacer 9 and the absorber 7 before reaching an introduction tube 6 or a mirror holder 5 so that an energy of the scattering laser beam 8 is attenuated significantly. Therefore, if the introduction tube 6 or the mirror holder 5 is irradiated with the scattering laser beam 8 after being received, absorbed and reflected repeatedly by the spacer 9 and the absorber 7 and passing through the through hole 9a of the spacer 9, the scattering laser beam 8 cannot influence thermally the introduction tube 6 or the mirror holder 5 significantly.

The spacer 9 has the at least one small through hole 9b other than the laser beam passing through hole 9a, and a cooling medium fills an inside of the small through hole 9b. Since a thermal energy generated when the spacer 9 is irradiated with the scattering laser beam 8 is absorbed by the cooling medium 12 circulated always by a cooler 11, a temperature increase of the spacer 9 is very small and a temperature of the spacer 9 is kept substantially constant.

Since the temperature of the spacer 9 is constant, a thermal conduction from the spacer to the introduction tube 6 does not occur. Since a temperature of the introduction tube 6 is constant, a thermal conduction from the introduction tube 6 to the mirror holder 5 does not occur.

For these reasons, since the temperature of the mirror holder 5 is kept constant and the deformation by the thermal energy does not occur, the mirror holder 5 can maintain a parallelism of optical amplifying mirrors 3a and 3b necessary for optical amplifying, so that a stableness of the laser beam is obtainable.

In this embodiment, the through hole of the spacer is a round shape, but can be modified to a different shape as the occasion may demand.

Second Embodiment

The second embodiment of the present invention is described below.

Figure 2:
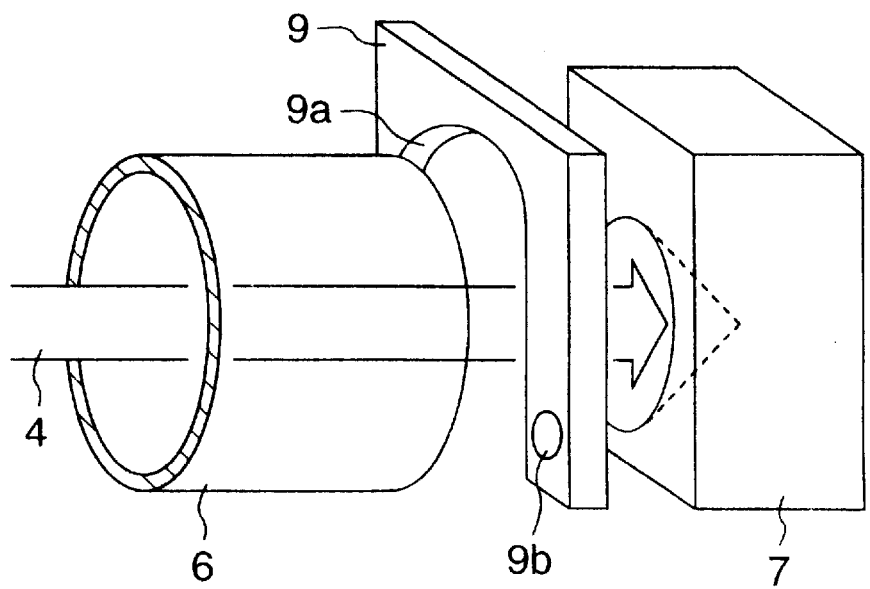
FIG. 2 is an exterior view showing a spacer in a second embodiment of a laser generator according to the present invention.

FIG. 2 is an exterior view of the second embodiment of the present invention. The through hole of the spacer of the first embodiment is changed to a half-round notch. This embodiment has the similar advantageous effect as the first embodiment.

In addition, in this embodiment, since the laser beam passing through hole has a half-round notch shape, a material amount of the spacer can be reduced to obtain a merit on cost.

Third Embodiment

The third embodiment of the present invention is described below.

Figure 3:
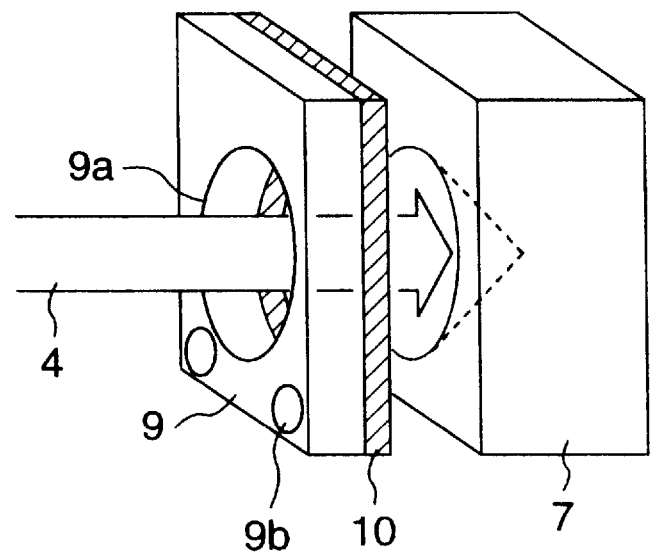
FIG. 3 is an exterior view showing a spacer in a third embodiment of a laser generator according to the present invention.

FIG. 3 is an exterior view of the third embodiment of the present invention. The surface of the spacer is coated with a scattering laser beam absorbing material 10. The great part of the scattering laser beam 8 around the absorber 7 is absorbed by the scattering laser beam absorbing material 10 so that an energy of the scattering laser beam 8 is attenuated significantly before reaching the introduction tube 6 or the mirror holder 5. Therefore, the scattering laser beam 8 cannot influence significantly thermally the introduction tube 6 and the mirror holder 5.

In this way, since a laser beam absorbing efficient of the spacer is improved to increase a damping of the scattering laser beam, an influence in deformation by thermal energy of the scattering laser beam to the mirror holder is eliminated.

Fourth Embodiment

The fourth embodiment of the present invention is described below.

Figure 4:
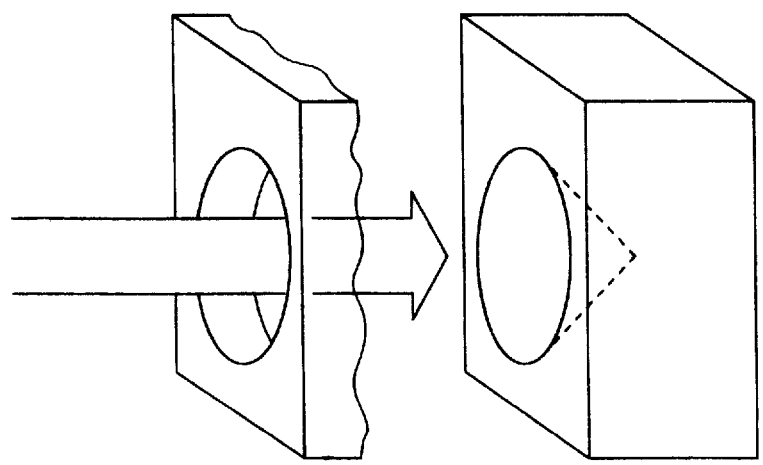
FIG. 4 is an exterior view showing a spacer in a fourth embodiment of a laser generator according to the present invention.

FIG. 4 is an exterior view of the fourth embodiment of the present invention. The surface of the spacer 9 has irregularities formed by etching, mechanical machining or the like to accelerate absorbing the scattering laser beam. This embodiment has the similar advantageous effect as the third embodiment.

TECHNICAL APPLICABILITY

As understood from the above descriptions, according to the present invention, since the spacer acts as the barrier, the great part of the scattering laser beam at the circumference of the absorber is repeatedly received, absorbed and reflected by the spacer and the absorber before reaching the introduction tube and/or the mirror holder, so that the energy of the scattering laser beam is significantly attenuated thereby and the deformation of the mirror holder by the thermal energy can be prevented.

Since the mirror holder is prevented from being deformed by the thermal energy and is stable, the parallelism of the optical amplifying mirrors necessary for the optical amplifying is maintained so that the laser generator can generate the stable laser beam.

We claim:

1. A laser generator comprising:
   (a) a laser generating device for generating a laser beam which has a proceeding course, the laser generating device having ends and an interior portion, the laser generating device comprising:
      (i) optical amplifying mirrors at the ends of the laser generating device; and
      (ii) a laser medium in said interior portion:
   (b) an absorber movable between (i) a laser outputting position at which the absorber does not interrupt the laser beam so that the laser beam is taken out of the laser generator and (ii) a laser absorbing position at which the absorber receives and absorbs the laser beam to prevent the laser beam from being output by the laser generator; and
   (c) a spacer arranged between the laser generating device and the laser absorbing position of the absorber and having a through hole on the proceeding course of the laser beam.

2. A laser generator according to claim 1, comprising a cooling medium for cooling the spacer.

3. A laser generator according to claim 1, wherein the through hole of the spacer has a half-round notch shape.

4. A laser generator according to claim 1, further comprising a material for absorbing a scattering laser beam scattered from the absorber when the absorber receives the laser beam, the material being coated on a surface of the spacer facing the absorber.

5. A laser generator according to claim 1, wherein a surface of the spacer has irregularities.

6. A laser generator according to claim 1, wherein the laser generating device further comprises a mirror holder for holding the optical amplifying mirrors.

7. A laser generator comprising
   (a) a laser generating device for generating a laser beam which has a proceeding course, the laser generating device having ends and an interior portion, the laser generating device comprising:
(i) optical amplifying mirrors at the ends of the laser generating device; and
(ii) a laser medium in said interior portion;

(b) an absorber movable between (i) a laser outputting position at which the absorber does not interrupt the laser beam so that the laser beam is taken out of the laser generator and (ii) a laser absorbing position at which the absorber receives and absorbs the laser beam to prevent the laser beam from being output by the laser generator;

(c) a spacer arranged between the laser generating device and the laser absorbing position of the absorber and having a through hole on the proceeding course of the laser beam; and (d) an introduction tube for passing the laser beam through the introduction tube toward the absorber.

8. A laser generator according to claim 7, further comprising a cooling medium for cooling the spacer.

9. A laser generator according to claim 7, wherein the through hole of the spacer has a half-round notch shape.

10. A laser generator according to claim 7, further comprising a material for absorbing a scattering laser beam scattered from the absorber when the absorber receives the laser beam, the material being coated on a surface of the spacer facing the absorber.

11. A laser generator according to claim 7, wherein a surface of the spacer has irregularities.

12. A laser generator according to claim 7, wherein the laser generating device further comprises a mirror holder for holding the optical amplifying mirrors.

13. A laser generator according to claim 12, wherein the introduction tube is disposed to pass the laser beam through the introduction tube between the mirror holder and the spacer.

14. A laser generator according to claim 7, wherein the introduction tube is disposed to pass the laser beam through the introduction tube between the laser generating device and the spacer.

15. A laser generator according to claim 7, wherein the introduction tube is disposed to pass the laser beam through the introduction tube between the optical amplifying mirrors and the spacer.

16. A laser generator comprising:
(a) a laser generating device comprising a laser medium and an optically amplifying mirror, the laser generating device generating a laser beam by energizing the laser medium and optically amplifying the laser beam with an optically amplifying mirror;

(b) an absorber receiving the laser beam and movable between (i) a laser outputting position at which the absorber does not interrupt the laser beam so that the laser beam is taken out of the laser generator and (ii) a laser absorbing position at which the absorber receives and absorbs the laser beam to prevent the laser beam from being output by the laser generator; and (c) a spacer which is arranged at a circumference of the absorber when the absorber is in the laser absorbing position and has a through hole for passing the laser beam through the spacer.

17. A laser generator according to claim 16, further comprising a cooling medium for cooling the spacer.

18. A laser generator according to claim 16, wherein the through hole of the spacer has a half-round notch shape.

19. A laser generator according to claim 16, further comprising a material for absorbing a scattering laser beam scattered from the absorber when the absorber receives the laser beam, the material being coated on a surface of the spacer facing the absorber.

20. A laser generator according to claim 16, wherein a surface of the spacer has irregularities.

* * * * *